United States Patent
Kurogi et al.

(10) Patent No.: US 10,913,416 B2
(45) Date of Patent: Feb. 9, 2021

(54) SKELETON STRUCTURE OF VEHICLE FRONT PART

(71) Applicant: TOYOTA JIDOSHA KABUSHIKI KAISHA, Toyota (JP)

(72) Inventors: Sosuke Kurogi, Okazaki (JP); Takashi Tagaito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/257,534

(22) Filed: Jan. 25, 2019

(65) Prior Publication Data
US 2019/0232904 A1    Aug. 1, 2019

(30) Foreign Application Priority Data

Jan. 30, 2018 (JP) .................. 2018-013341

(51) Int. Cl.
*B60R 19/34* (2006.01)
*B60R 19/18* (2006.01)
*B62D 21/15* (2006.01)

(52) U.S. Cl.
CPC .............. *B60R 19/34* (2013.01); *B60R 19/18* (2013.01); *B62D 21/152* (2013.01); *B60R 2019/186* (2013.01)

(58) Field of Classification Search
CPC .... B60R 2021/0009; B60R 2021/0023; B60R 2019/1813; B60R 2019/1826; B62D 29/007
See application file for complete search history.

(56) References Cited

U.S. PATENT DOCUMENTS

| | | | | | |
|---|---|---|---|---|---|
| 4,413,856 | A | * | 11/1983 | McMahan | B60R 19/26 293/110 |
| 5,139,297 | A | * | 8/1992 | Carpenter | B60R 19/22 293/109 |
| 5,314,229 | A | * | 5/1994 | Matuzawa | B60R 19/34 188/377 |
| 6,106,039 | A | * | 8/2000 | Maki | B60R 19/12 293/132 |
| 6,179,355 | B1 | * | 1/2001 | Chou | B60R 19/18 188/377 |
| 7,461,874 | B2 | * | 12/2008 | Guiles | B60R 19/18 29/897.2 |
| 8,505,990 | B2 | * | 8/2013 | Czopek | B60R 19/18 293/102 |
| 8,662,546 | B2 | * | 3/2014 | Kizaki | B60R 19/18 293/133 |

(Continued)

FOREIGN PATENT DOCUMENTS

| | | | | |
|---|---|---|---|---|
| DE | 202017101524 U1 | * | 4/2017 | ............. B60R 19/18 |
| EP | 0854066 A1 | * | 7/1998 | ............. B62D 21/15 |

(Continued)

*Primary Examiner* — Hilary L Gutman
(74) *Attorney, Agent, or Firm* — Oliff PLC

(57) ABSTRACT

A skeleton structure of a front part of a vehicle has a reinforcement member that has a higher rigidity than a bumper reinforcement and that is housed in an end, in a width direction of the vehicle, of the bumper reinforcement. With this structure, passing-through of the vehicle from a barrier during a small overlap collision is suppressed, and an amount of absorption of collision energy by the skeleton member can be increased.

4 Claims, 12 Drawing Sheets

(56) References Cited

U.S. PATENT DOCUMENTS

| | | | |
|---|---|---|---|
| 8,801,083 B2* | 8/2014 | Miyashita | B62D 21/152 |
| | | | 296/187.1 |
| 9,290,140 B2* | 3/2016 | Matsushiro | B60R 19/023 |
| 9,315,167 B1* | 4/2016 | Hardy | B62D 25/082 |
| 9,849,914 B2* | 12/2017 | Elliott | B62D 21/152 |
| 2005/0236850 A1* | 10/2005 | Evans | B60R 19/18 |
| | | | 293/102 |
| 2006/0043744 A1* | 3/2006 | Iketo | B60R 19/34 |
| | | | 293/132 |
| 2007/0029824 A1* | 2/2007 | Hodoya | B60R 19/18 |
| | | | 293/102 |
| 2009/0079210 A1* | 3/2009 | Matsumura | B60R 19/24 |
| | | | 293/155 |
| 2012/0146348 A1* | 6/2012 | Di Modugno | B60R 19/34 |
| | | | 293/133 |

FOREIGN PATENT DOCUMENTS

| | | | | |
|---|---|---|---|---|
| JP | 2015-147437 A | 8/2015 | | |
| WO | WO-2006117412 A2 * | 11/2006 | | B60R 19/04 |

* cited by examiner

SKELETON STRUCTURE OF VEHICLE FRONT PART

CROSS REFERENCE TO RELATED APPLICATION

This application claims priority to Japanese Patent Application No. 2018-013341 filed on Jan. 30, 2018, which is incorporated herein by reference in its entirety including the specification, claims, drawings, and abstract.

TECHNICAL FIELD

The present disclosure relates to a skeleton structure of a front part of a vehicle.

BACKGROUND

A skeleton structure is provided at a front part of a vehicle in order to absorb impact at an engine compartment (vehicle front part structure) at a front side in relation to a cabin (vehicle cabin) and to secure a cabin space during a front collision of the vehicle (hereinafter, also referred to as "front collision").

For example, as a skeleton structure of the front part of the vehicle, a pair of left and right front side members (hereinafter, also referred to as "Fr side members") are provided and extend in a front-and-rear direction of the vehicle. Further, a bumper reinforcement (hereinafter, also referred to as a "bumper R/F") which extends in a width direction of the vehicle is provided over front ends of the pair of Fr side members.

As a form of the front collision, a small overlap (SOL) collision is known. In this form of collision, the vehicle collides with a barrier having a width of about ¼ of a vehicle width from a side end of the vehicle. In this process, a region, of the bumper R/F, of a width of about ¼ of the vehicle width from the side end of the vehicle receives a collision load. Further, with this process, the collision load is transferred to a crash box at a further rear side and to the Fr side member.

As exemplified in FIGS. 8 and 9, a bumper R/F 100 is, for example, a hollow member having a closed cross section structure, and absorbs energy of the collision by collapse-deforming from the front side during the front collision. Further, the energy of the collision is absorbed by collapse deformation of a crash box 104 and folding deformation of a Fr side member 102, or the like. With the absorption of the energy of the collision, the vehicle is decelerated.

For example, in JP 2015-147437 A, side bulk which is a reinforcement member is provided in the bumper R/F, at a location positioned in front of the crash box. The side bulk is fixed to a front surface portion of the bumper R/F. During the small overlap collision, of the front surface portion of the bumper R/F, a bending load to an outer side in the width direction of the vehicle and to a rearward direction is input to a location positioned in front of the crash box, and a tensile stress is generated at this location. The side bulk functions as a reinforcement member against the tensile stress, and suppresses folding of the bumper R/F caused by the tensile stress.

The side bulk is formed by injection-molding a resin, and absorbs the collision energy during the front collision by collapse-deforming along with the bumper R/F.

During the small overlap collision, there may be cases where the vehicle passes through the barrier in a state where there still remains a further margin of absorption of the collision energy. As exemplified in FIG. 10, in the small overlap collision, a barrier 106 collides with a location deviated from a center C of a vehicle 108. In addition, in order to reduce the air resistance and from the viewpoint of design, for the front surface of the vehicle, a design is employed in which the design is inclined in the rearward direction, from the center in the width direction toward the outer side. Due to the collision form and the vehicle front surface structure as described, during the small overlap collision, a force is generated which causes the vehicle 108 to pass through the barrier 106, in a slanted front side on an opposite side from the barrier 106.

FIG. 11 shows a periphery enlarged view of the barrier 106. The bumper R/F 100 is caused by the barrier 106 to collapse-deform. In this case, a non-deformed part 100B at an outer side in the width direction in relation to a collapse-deformation part 100A is sequentially collapse-deformed, with the progress of the vehicle toward the slanted front side. As exemplified in FIG. 12, when the barrier 106 reaches an end, in the width direction, of the bumper R/F 100, the vehicle 108 passes through the barrier 106.

With the collapse of the bumper R/F 100 caused from FIG. 11 to FIG. 12, the collision energy is absorbed to a certain degree, but there have been cases where the vehicle 108 passes through the barrier 106 in a state where the energy is not absorbed to a maximum possible degree based on the design, such as a case where, for example, the Fr side member 102 is fold-deformed only to a very small degree. As described, there is room of improvement in the skeleton structure of the vehicle front part in the related art, from the viewpoint of deceleration of the vehicle 108 due to the energy absorption during the small overlap collision.

SUMMARY

According to one aspect of the present disclosure, there is provided a skeleton structure of a vehicle front part. The structure comprises a pair of side skeleton members, a bumper reinforcement, and a reinforcement member. The pair of side skeleton members are provided at respective sides, in a width direction of the vehicle, of a front part of the vehicle, and extend in a front-and-rear direction. The bumper reinforcement extends in the width direction of the vehicle, and is connected to front ends of the pair of the side skeleton members. The bumper reinforcement also has a hollow, closed cross section structure. The reinforcement member has a higher rigidity than the bumper reinforcement, and is housed in an end, in the width direction of the vehicle, of the bumper reinforcement.

According to the above-described structure, during the small overlap collision, a region of the bumper reinforcement at an inner side in the width direction in relation to the reinforcement member is collapse-deformed by the barrier. Further, when the vehicle attempts to pass through the barrier in the slanted front side, collapse deformation of the end of the bumper reinforcement is suppressed by the reinforcement member housed in the end, in the width direction, of the bumper reinforcement. As a consequence of the collapse deformation of the inner side, in the width direction, of the bumper reinforcement and the suppressing of the collapse deformation of the outer side of the bumper reinforcement, the barrier is hooked on the bumper reinforcement and the passing-through of the vehicle with respect to the barrier in the slanted front side is stopped. As a result, the deformation of the skeleton member progresses with the progress of the barrier, and the collision energy is absorbed.

According to another aspect of the present disclosure, the pair of side skeleton members and the bumper reinforcement may be connected to each other via a crash box which is more easily collapse-deformed in comparison to the pair of the side skeleton members and the bumper reinforcement. In this case, the reinforcement member is housed in the bumper reinforcement at a location in front of the crash box.

According to the above-described structure, at a housed location of the reinforcement member of the bumper reinforcement in which the collapse deformation is suppressed, the crash box is collapse-deformed in place of this location. With this process, the collision energy is absorbed.

According to another aspect of the present disclosure, at least a part of the reinforcement member may extend from an inner surface of a front-side wall of the bumper reinforcement to an inner surface of a rear-side wall of the bumper reinforcement.

According to the above-described structure, because the collapse deformation of the bumper reinforcement is suppressed over an entire length in the front-and-rear direction of the vehicle, the bumper reinforcement can be reliably hooked on the barrier.

According to the present disclosure, passing-through of the vehicle from the barrier during the small overlap collision is suppressed, and an amount of absorption of the collision energy by the skeleton member can be increased as compared to the related art.

BRIEF DESCRIPTION OF DRAWINGS

Embodiment(s) of the present disclosure will be described by reference to the following figures, wherein.

DESCRIPTION OF EMBODIMENTS

A skeleton structure of a front part of a vehicle according to an embodiment of the present disclosure will now be described with reference to FIGS. 1~7. In FIGS. 1~7, a front-and-rear direction of the vehicle is shown by an axis represented by reference sign FR, a width direction of the vehicle (hereinafter, also simply referred to as "width direction") is shown by an axis represented by reference sign RW, and a vertical direction is shown by an axis represented by a reference sign UP. The reference sign FR is an abbreviation for "front," and the front-and-rear direction axis FR has a front direction of the vehicle as a positive direction. The reference sign RW is an abbreviation for "right width," and the width direction axis RW has a right width direction as a positive direction. The height axis UP has the upward direction as a positive direction.

Figure 1:
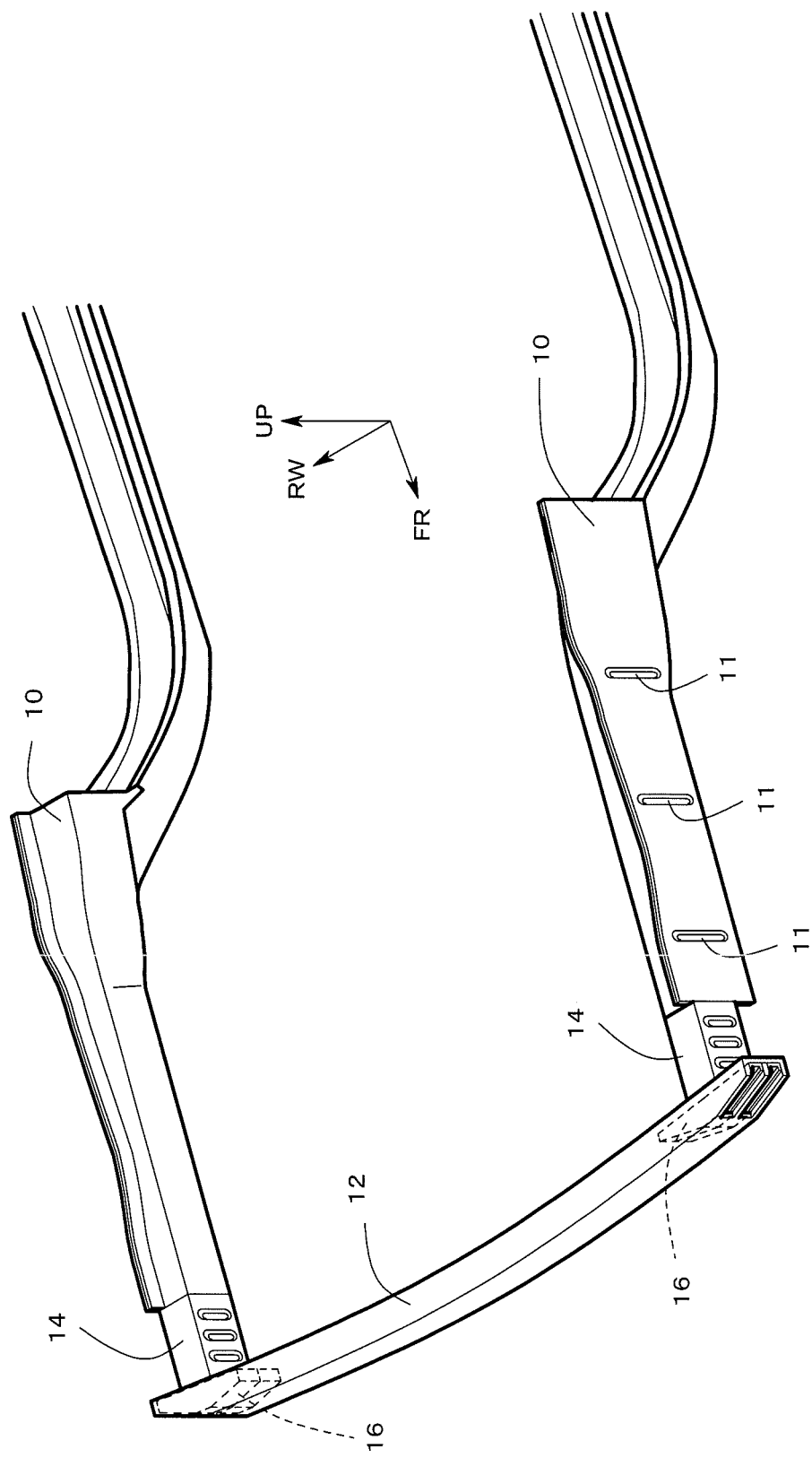
FIG. 1 is a perspective diagram exemplifying a skeleton structure of a front part of a vehicle according to an embodiment of the present disclosure.

As shown in FIG. 1, the FR axis, the RW axis, and the UP axis are orthogonal to each other. In the following, in the description of the skeleton structure of the front part of the vehicle according to the present embodiment, these three axis are referred to as a reference. For example, a "front end" refers to an end of an arbitrary member in a positive direction side of the FR axis, and a "rear end" refers to an end of an arbitrary member in a negative direction side of the FR axis. Similarly, a "width inner side" refers to a relatively inner side in the width direction of the vehicle along the RW axis, and a "width outer side" refers to a relatively outer side in the width direction of the vehicle along the RW axis. Further, an "upper side" refers to a relatively positive direction side of the UP axis, and a "lower side" refers to a relatively negative direction side of the UP axis.

FIG. 1 is a perspective diagram of a skeleton structure of a front part of a vehicle according to the present embodiment. The skeleton structure exemplified in FIG. 1 is only an upper structure, and a lower structure of the skeleton structure such as, for example, a suspension member or the like, is not shown.

The skeleton structure of the front part of the vehicle according to the present embodiment comprises Fr side members 10, 10, a bumper RIF 12, crash boxes 14, 14, and reinforcement members 16, 16.

The Fr side members 10, 10 are a pair of side skeleton members provided at respective sides, in the width direction of the vehicle, of the front part of the vehicle, and extend in a front-and-rear direction. For example, the Fr side members 10, 10 are formed as hollow members having a closed cross section structure. In addition, in the Fr side members 10, 10, a plurality of folding beads 11 (recess beads) extending in the up-and-down direction are formed in the front-and-rear direction, as a starting point of a folding deformation (deformation start point). Between the Fr side members 10, 10, a drive source of an internal combustion engine, a peripheral device such as a radiator and an intake, or the like are mounted.

Figure 2:
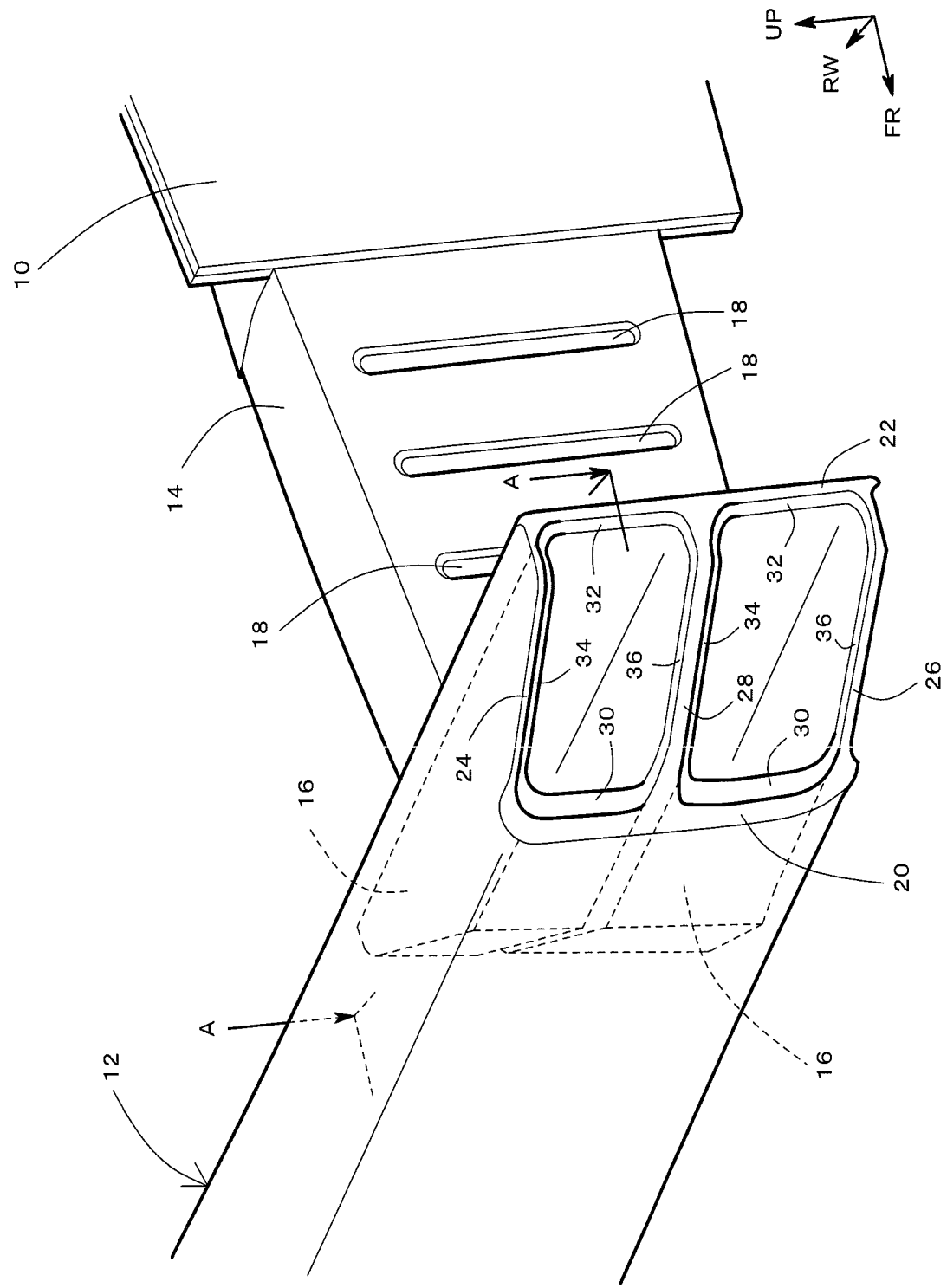
FIG. 2 is an enlarged perspective diagram of a region around an end, in a width direction of a bumper reinforcement, of a skeleton structure of a front part of a vehicle according to an embodiment of the present disclosure.

The crash boxes 14, 14 are provided between front ends of the Fr side members 10, 10, and the bumper R/F, and connect these members. The crash box 14 has a structure which is more easily collapse-deformed in comparison to the Fr side member 10 and the bumper R/F 12. For example, as shown in FIG. 2, a plurality of folding beads 18 which become a deformation starting point and which extend in the up-and-down direction are formed on the crash box 14 in the front-and-rear direction. The crash box 14 is formed from a material of a lower rigidity than the Fr side member 10 and the bumper R/F 12, and is formed, for example, by press-molding an aluminum plate. As will be described below, during the front collision, for example, the crash box 14 is collapse-deformed in a bellows shape, and absorbs the collision energy.

The bumper R/F 12 is a skeleton member which extends in the width direction of the vehicle, and which is connected to front ends of the Fr side members 10, 10 (via the crash boxes 14, 14). As exemplified in FIG. 1, the bumper RIF 12 has an approximate arc shape, with a center portion in the width direction protruding in the front side in comparison to ends in the width direction.

The bumper R/F 12 has a hollow, closed cross section structure. In addition, ends of the bumper RIF 12 in the width direction have the front side cut in a slanted manner. Specifically, as exemplified in FIG. 2, a rear-side wall 22 of the bumper R/F 12 protrudes in an outer side in the width direction in comparison to a front-side wall 20 of the bumper R/F 12, and an upper wall 24 and a lower wall 26 connecting the front-side wall 20 and the rear-side wall 22 have ends in the width direction inclined. With such a configuration, an outer appearance of side ends of the front part of the vehicle has a design with a curved shape.

As exemplified in FIG. 2, in an internal space of the bumper R/F 12, an intermediate wall 28 is provided which extends in the front-and-rear direction of the vehicle and which separates the internal space in the up-and-down direction. In the present embodiment, at the ends of the bumper R/F 12 in the width direction, the reinforcement member 16 is housed in the upper and lower internal spaces separated by the intermediate wall 28. The reinforcement member 16 may be provided at one end of the bumper R/F 12 in the width direction (right end or left end), or may be provided on both ends.

The reinforcement member 16 is formed from a member having a higher rigidity than the bumper R/F 12. For example, the reinforcement member 16 is formed from the same member as that of the bumper R/F 12, and with a thicker thickness than the bumper R/F 12. Alternatively, a member having a higher rigidity than the bumper R/F 12 (for example, a high tensile strength steel) may be used.

Thus, the location of the bumper R/F 12 in which the reinforcement member 16 is housed (hereinafter also referred to as "reinforcement location") is more difficult to be collapse-deformed in comparison to other locations. For example, when the reinforcement member 16 has a higher rigidity than the other skeleton member such as the Fr side member 10, in addition to the bumper R/F 12, during the front collision, the other skeleton member is deformed without the reinforcement location of the bumper R/F 12 being collapse-deformed. In this manner, by employing a configuration where a part of the bumper R/F 12 having the function to collapse-deform and to absorb the collision energy is intentionally prevented from the collapse deformation (or is difficult to be deformed), it becomes possible to set the reinforcement location to be the hook for a barrier 40 to be described later, and to suppress passing-through of the vehicle from the barrier.

Figure 3:
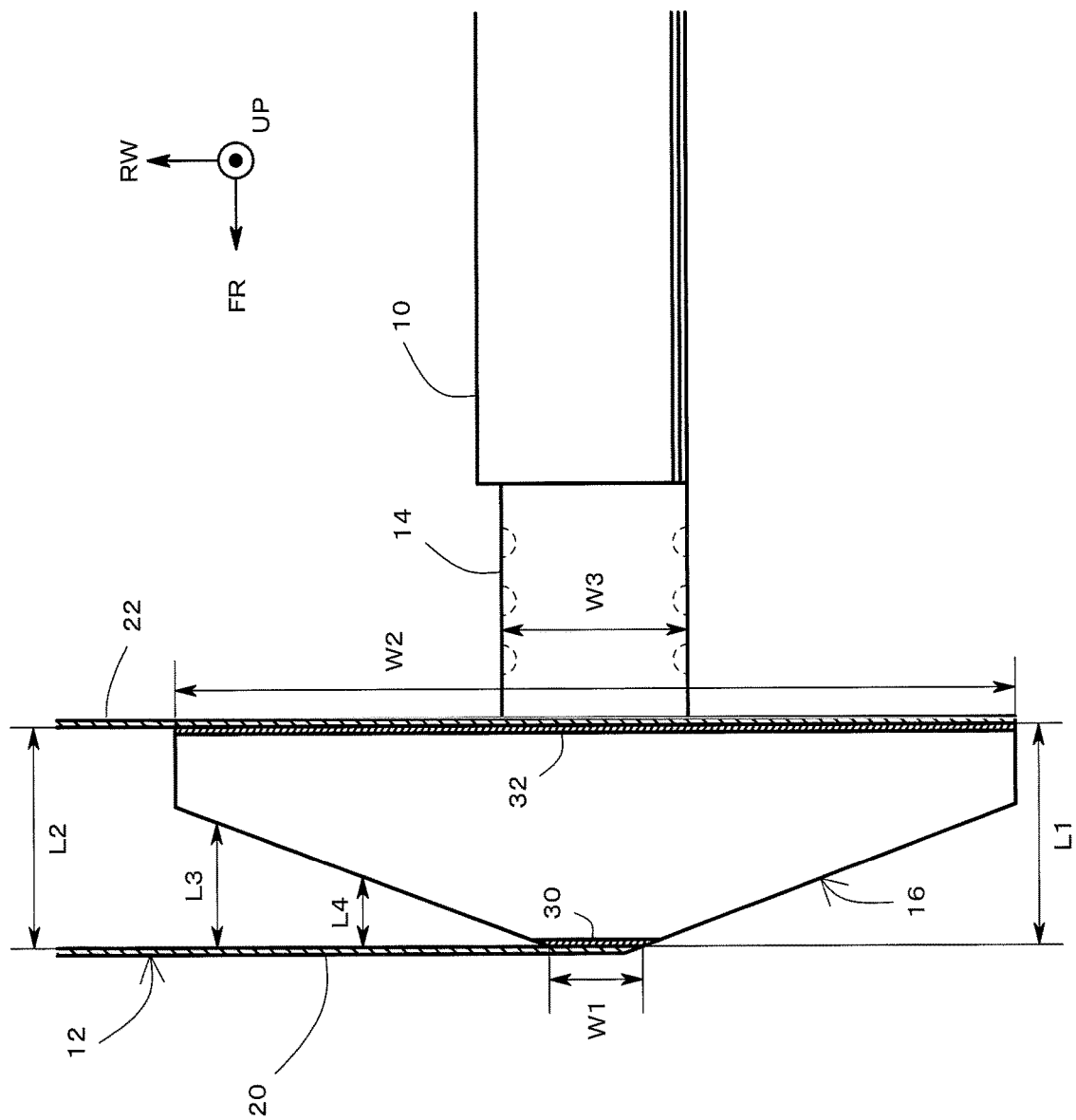
FIG. 3 is an A-A cross-sectional diagram of FIG. 2.

FIG. 2 exemplifies a perspective diagram of the reinforcement member 16, and FIG. 3 exemplifies an A-A cross-sectional diagram thereof. The reinforcement member 16 is a member having an approximate trapezoid shape in the plan view, and has a hollow inside. Specifically, the reinforcement member 16 comprises a front-side wall 30 placed at a front side of the vehicle, a rear-side wall 32 which opposes the front-side wall 30, an upper wall 34 which connects upper ends of the front-side wall 30 and the rear-side wall 32, and a lower wall 36 which connects lower ends of the front-side wall 30 and the rear-side wall 32.

With reference to FIG. 3, a width W1 of the front-side wall 30 of the reinforcement member 16 is set to be smaller than a width W2 of the rear-side wall 32. The upper wall 34 and the lower wall 36 connecting the front-side wall 30 and the rear-side wall 32 are formed in a slope shape, spreading in the width direction toward the rear side of the vehicle. Of the slope shape of the ends in the width direction, the slope shape of an end side in the width direction may be the same shape as a slope shape of the end of the bumper R/F 12 in the width direction, from the viewpoint of the design. In addition, during the assembly, the reinforcement member 16 may be housed in the bumper R/F 12 such that the slope shapes of the bumper R/F 12 and the reinforcement member 16 are aligned (matched).

The slope shape at an inner side, in the width direction, of the reinforcement member 16 may be line-symmetric with the slope shape of the end in the width direction. By employing the slope shape for the inner side, in the width direction, of the reinforcement member 16, it becomes possible to stepwise change a "collapsing margin" of the bumper R/F 12. For example, as shown in FIG. 3, a gap (separation distance) between a front surface of the reinforcement member and the front-side wall 20 of the bumper R/F 12 is the collapsing margin of the bumper R/F 12. By employing the slope shape for the inner side, in the width direction, of the reinforcement member 16, the collapsing margin is gradually reduced such as L3→L4, toward the outer side in the width direction. If the collapsing margin rapidly changes from, for example, 100% to 0%, a load would be concentrated at a boundary portion thereof, and the bumper R/F 12 may be ruptured. By adjusting the collapsing margin by the above-described slope shape, it becomes possible to suppress rupturing of the bumper R/F 12.

A length L1, in the front-and-rear direction of the vehicle, of the reinforcement member 16 may be equal to a distance L2 from an inner surface of the front-side wall 20 of the bumper R/F 12 to an inner surface of the rear-side wall 22. With this configuration, at least a part of the reinforcement member 16 extends from the inner surface of the front-side wall 20 of the bumper R/F 12 to the inner surface of the rear-side wall 22, and, in this portion, the collapse deformation of the bumper R/F 12 is suppressed over the entire length in the front-and-rear direction.

Because the collapse deformation is significantly suppressed at the reinforcement location of the bumper R/F 12, a rear member thereof may be collapse-deformed in place of the reinforcement location. Specifically, the reinforcement member 16 is housed in the bumper R/F 12, in front of the crash box 14. Further, the front-side wall 30 of the reinforcement member 16 may be placed at the vehicle front side of the crash box 14. Thus, the crash box 14 is provided behind a location having a longest length of the region which is difficult to be collapsed, to be collapse-deformed in place of the reinforcement location.

Figure 4:
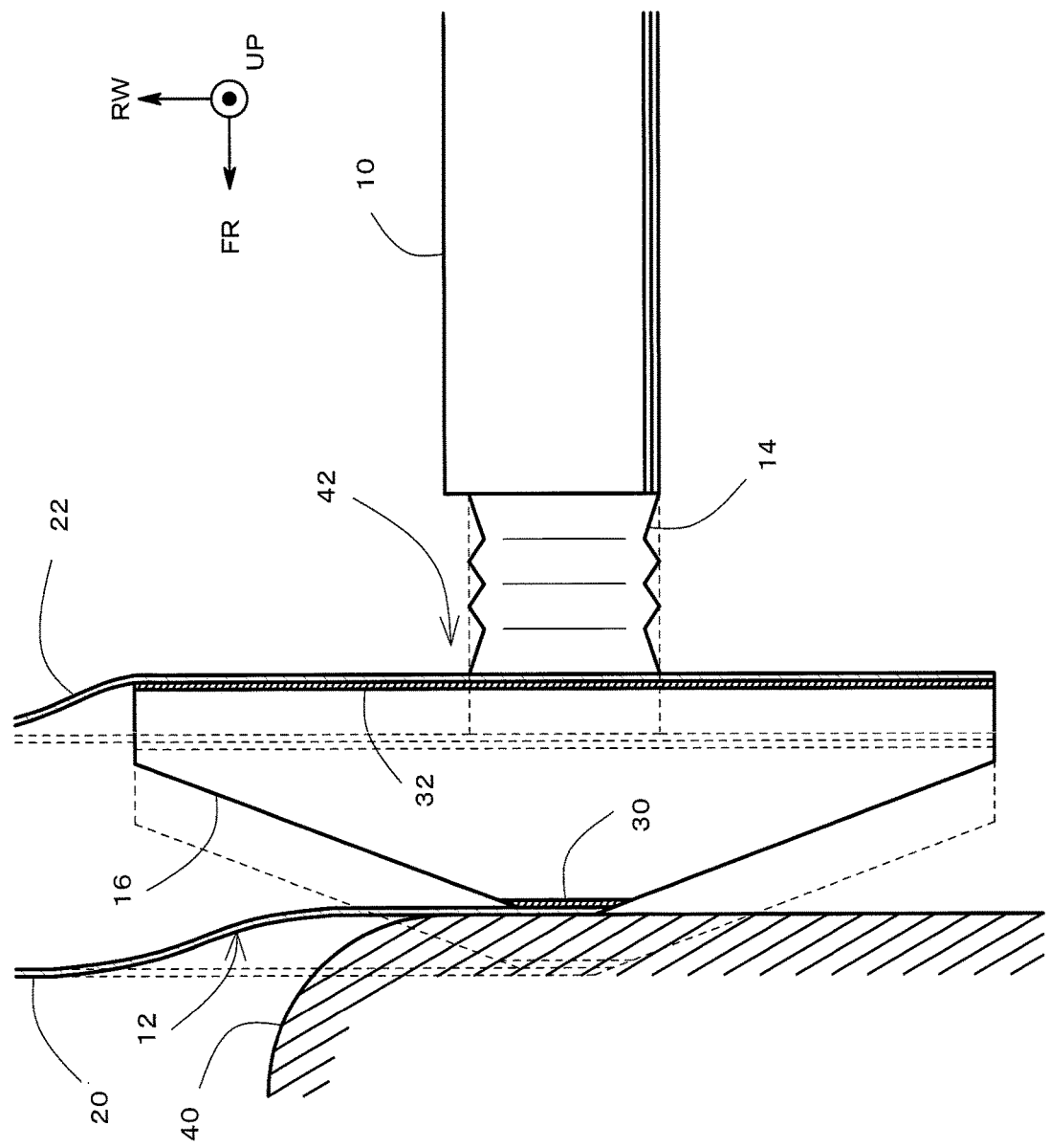
FIG. 4 is a diagram exemplifying an initial stage of small overlap collision.
Figure 5:
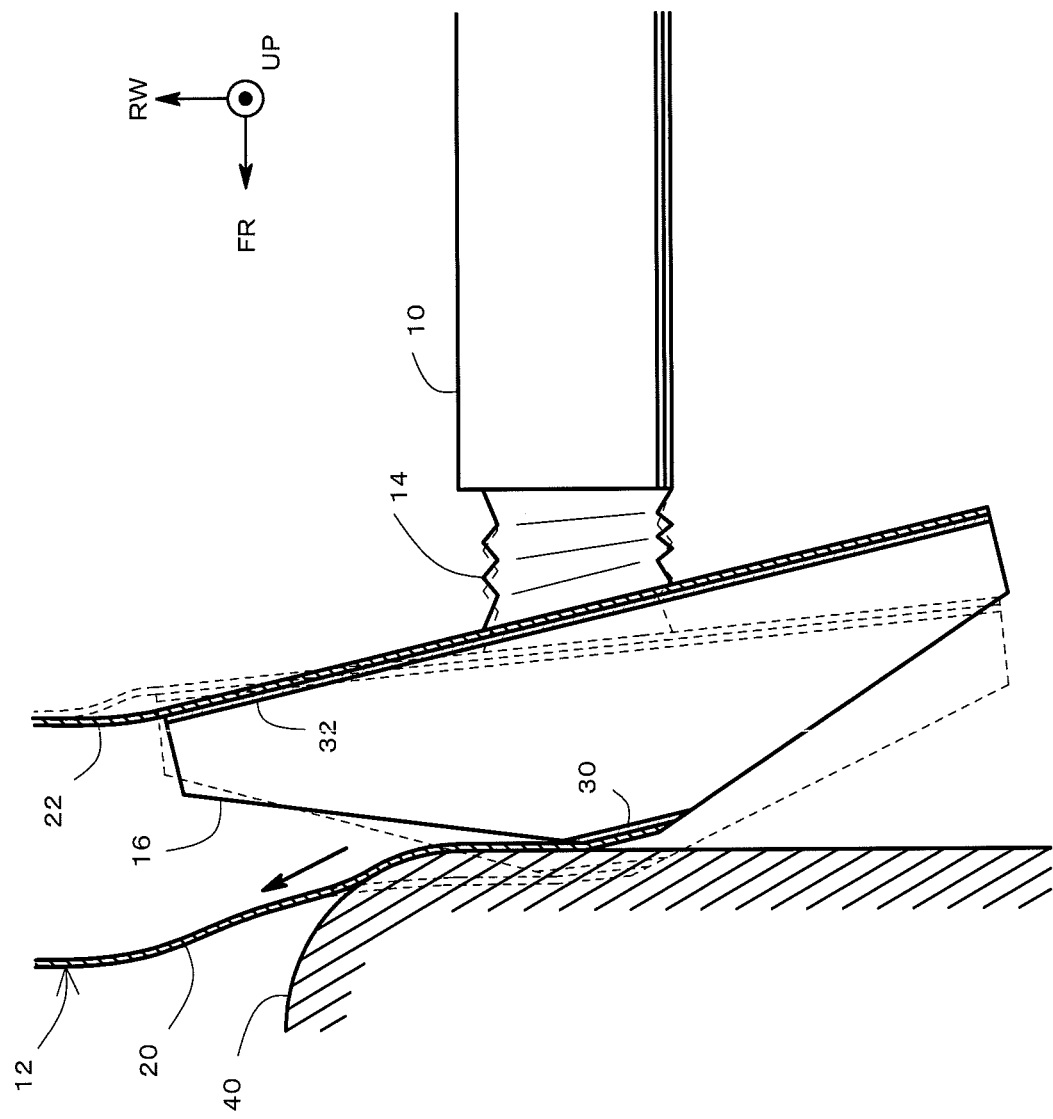
FIG. 5 is a diagram exemplifying progress of small overlap collision.

With reference to FIGS. 4 and 5, a behavior of the skeleton structure of the front part of the vehicle according to the present embodiment during the small overlap collision will be described. FIG. 4 shows an initial stage of the small overlap collision. When the barrier 40 collides with the bumper R/F 12, the front-side wall 30 of the reinforcement member 16 receives the barrier 40. A reinforcement location 42 of the bumper R/F 12 in which the reinforcement member 16 is housed transfers the load to the rear side while the collapse deformation thereof being suppressed. The crash box 14 at the rear side of the reinforcement location 42 receives the transferred load, and is collapse-deformed in the bellows shape.

Further, as exemplified in FIG. 5, the vehicle moves in the slanted front side with respect to the barrier 40. In this process, a portion, of the reinforcement member 16, at an inner side in the width direction than the front-side wall 30 is collapse-deformed. On the other hand, the collapse deformation does not occur at the front-side wall 30 of the reinforcement member 16, and a pocket for receiving and stopping the barrier 40 is formed at the inner side in the width direction in relation to the front-side wall 30. The barrier 40 caught in this pocket is hooked on the front-side wall 30 of the reinforcement member 16 at the outer side in the width direction, and, as a result, a displacement in the width direction between the vehicle and the barrier 40 is suppressed. In other words, the passing-through of the vehicle from the barrier 40 is prevented by the hooking of the reinforcement member 16.

As the barrier 40 enters the vehicle inside in a state where the passing-through is prevented, the skeleton member of the front part of the vehicle is deformed. For example, the Fr side member 10 fold-deforms. With this deformation, the energy of collision is absorbed, and the vehicle is decelerated.

<Other Configurations of Reinforcement Member>

Figure 6:
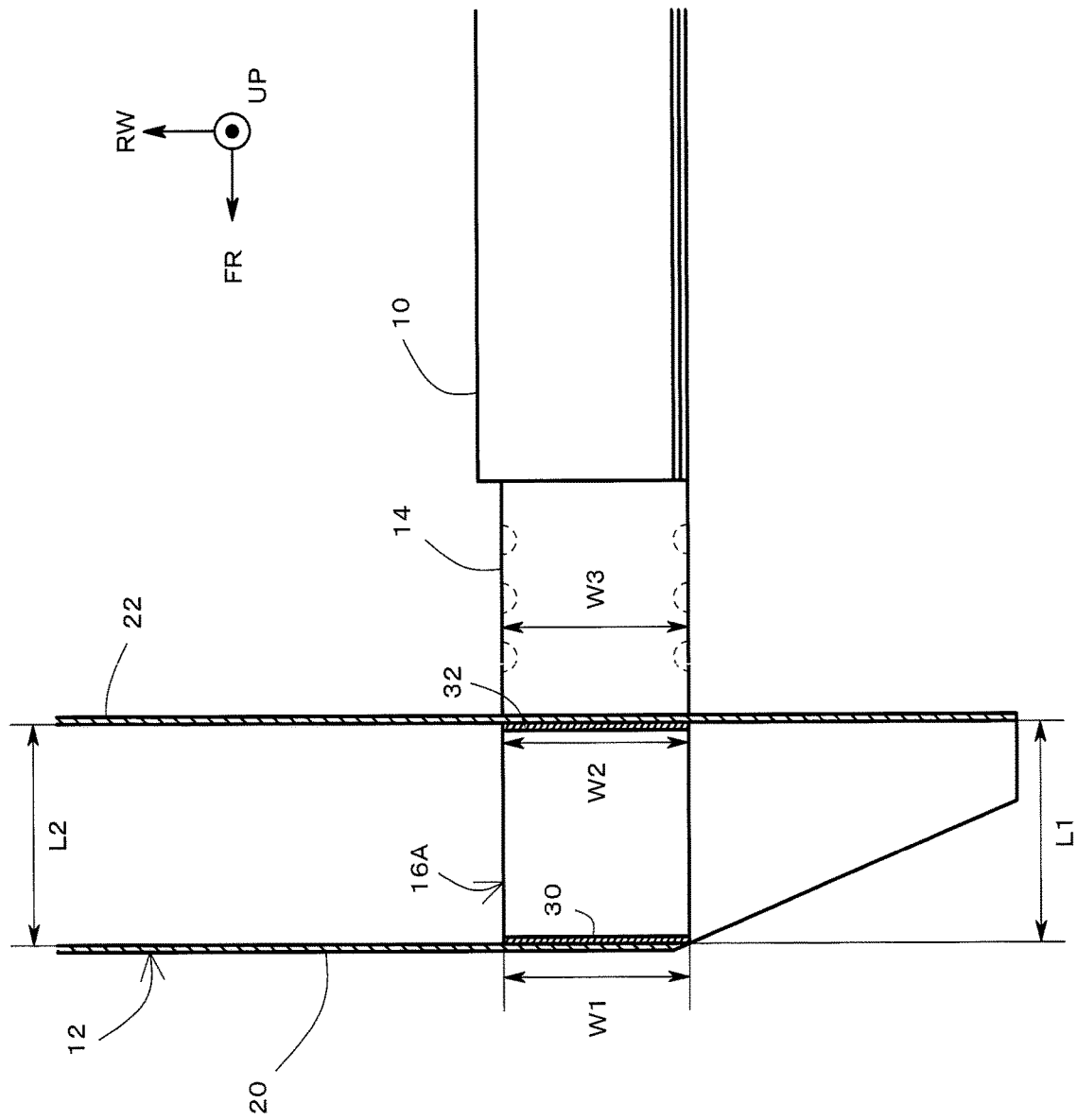
FIG. 6 is a diagram showing another configuration of a skeleton structure of a front part of a vehicle according to an embodiment of the present disclosure.

FIG. 6 exemplifies a reinforcement member 16A of another configuration of the present embodiment. In the reinforcement member 16A, the widths W1 and W2 of the front-side wall 30 and the rear-side wall 32 are formed equal to each other, and the reinforcement member 16A has a rectangular shape in plan view. For example, the widths W1 and W2 of the front-side wall 30 and the rear-side wall 32 are formed equal to a width W3 of the crash box 14. In addition, the length L1, in the front-and-rear direction of the vehicle, of the reinforcement member 16A may be equal to the distance L2 from the inner surface of the front-side wall 20 of the bumper RIF 12 to the inner surface of the rear-side wall 22.

As compared to the reinforcement member 16, in the reinforcement member 16A, the slope shape of the ends in the width direction is omitted. With such a structure also, during the small overlap collision, the reinforcement member 16A is hooked on the barrier 40, and the passing-through of the vehicle from the barrier can be suppressed.

Figure 7:
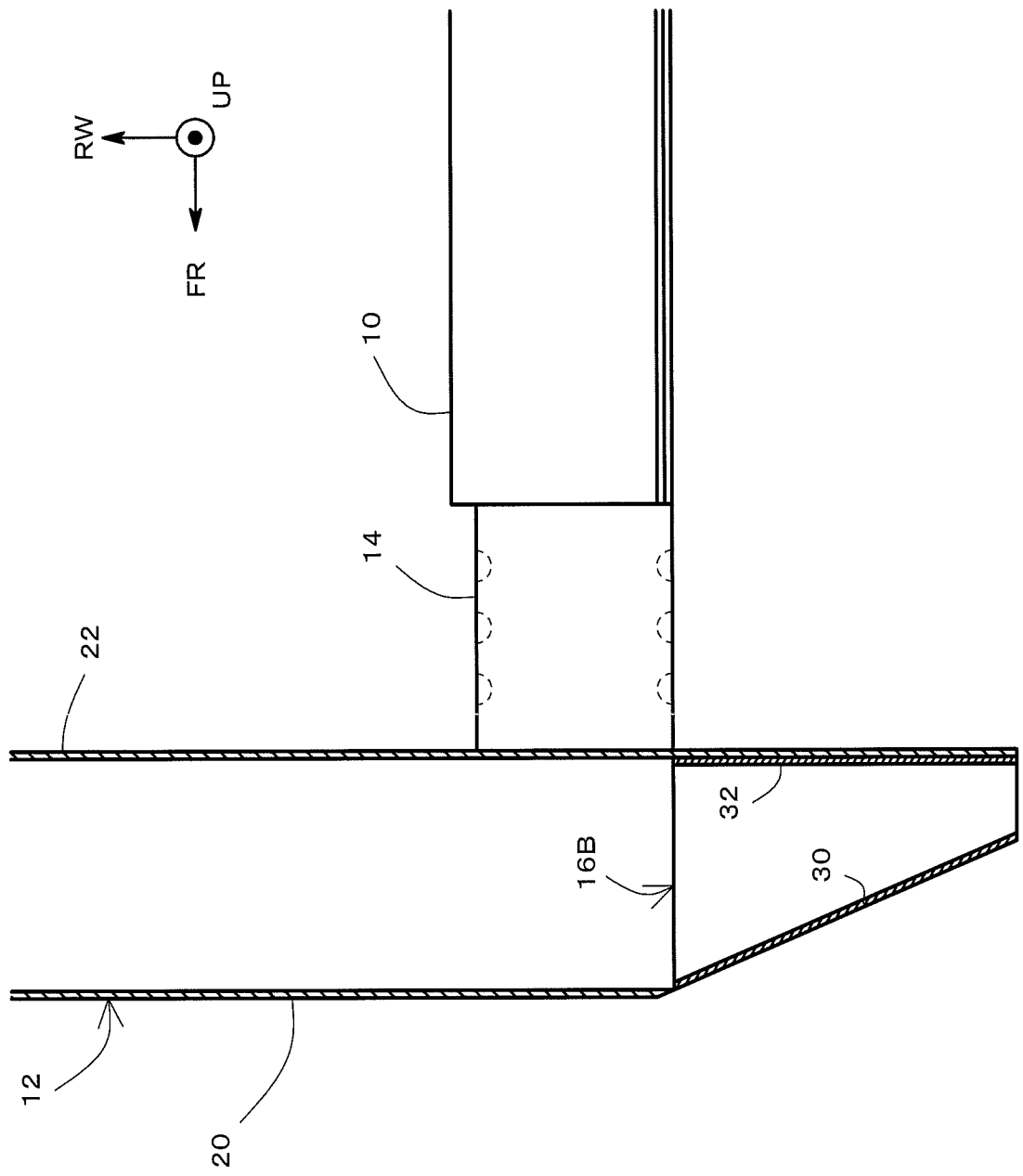
FIG. 7 is a diagram showing yet another configuration of a skeleton structure of a front part of a vehicle according to an embodiment of the present disclosure.
Figure 8:
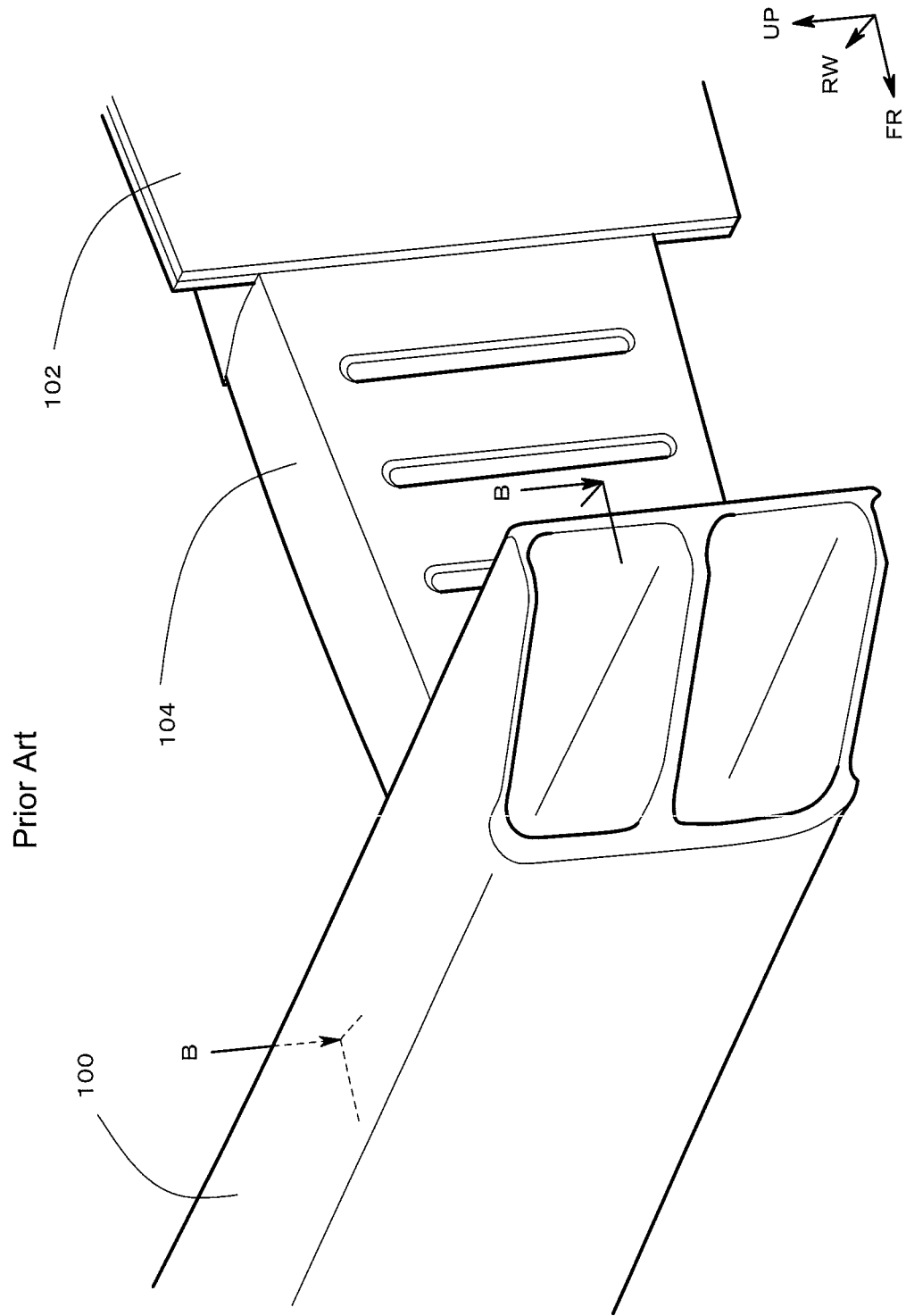
FIG. 8 is a perspective diagram exemplifying a skeleton structure of a front part of a vehicle according to the related art.
Figure 9:
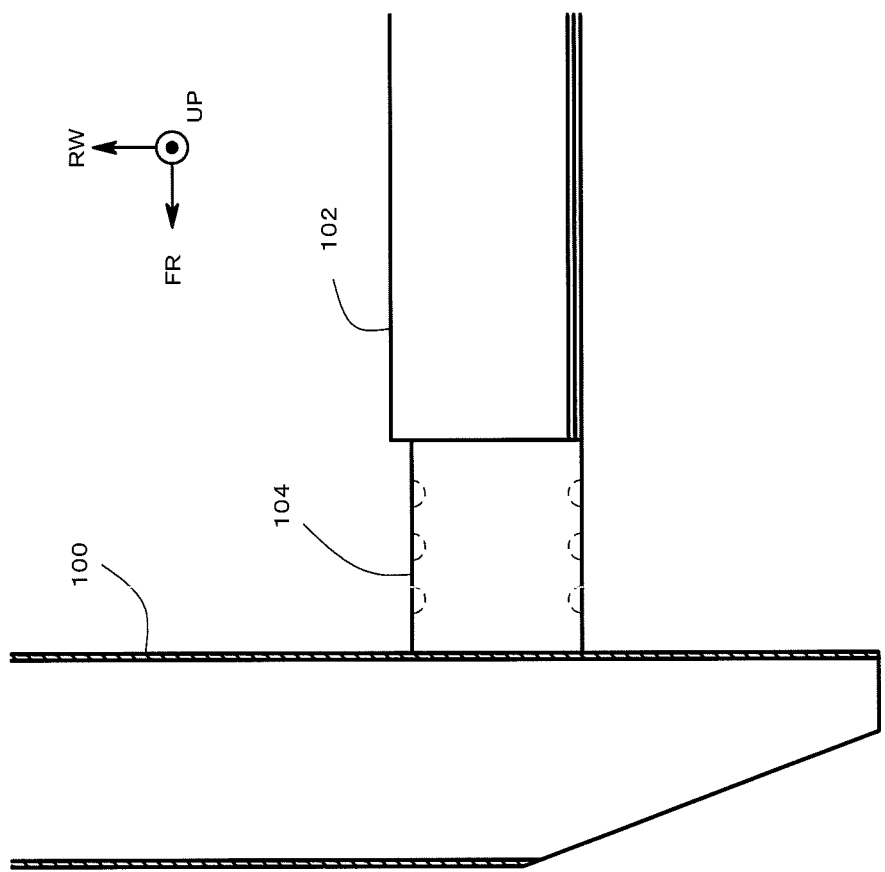
FIG. 9 is a B-B cross-sectional diagram of FIG. 8.
Figure 10:
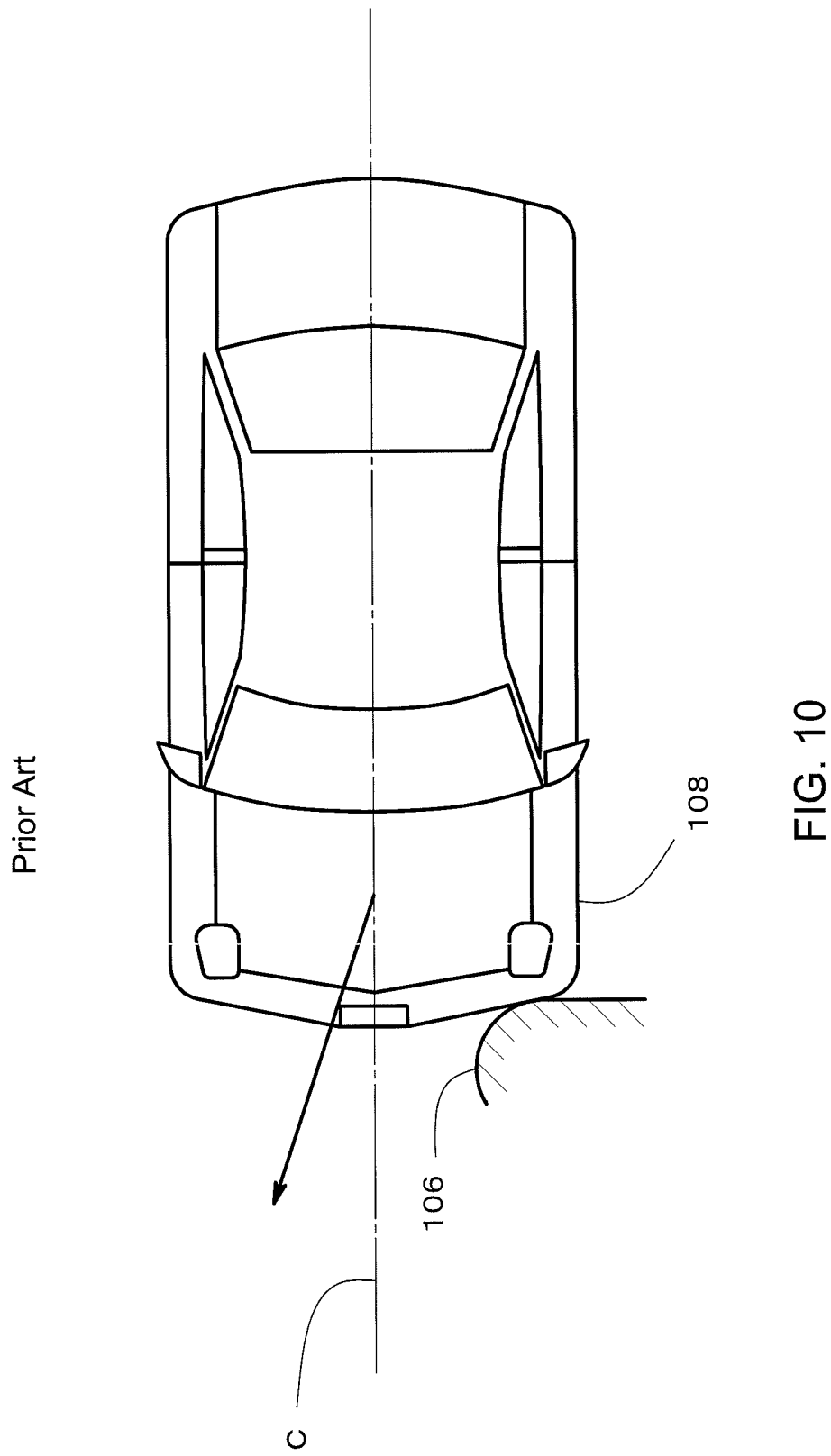
FIG. 10 is a plan view showing a small overlap collision.
Figure 11:
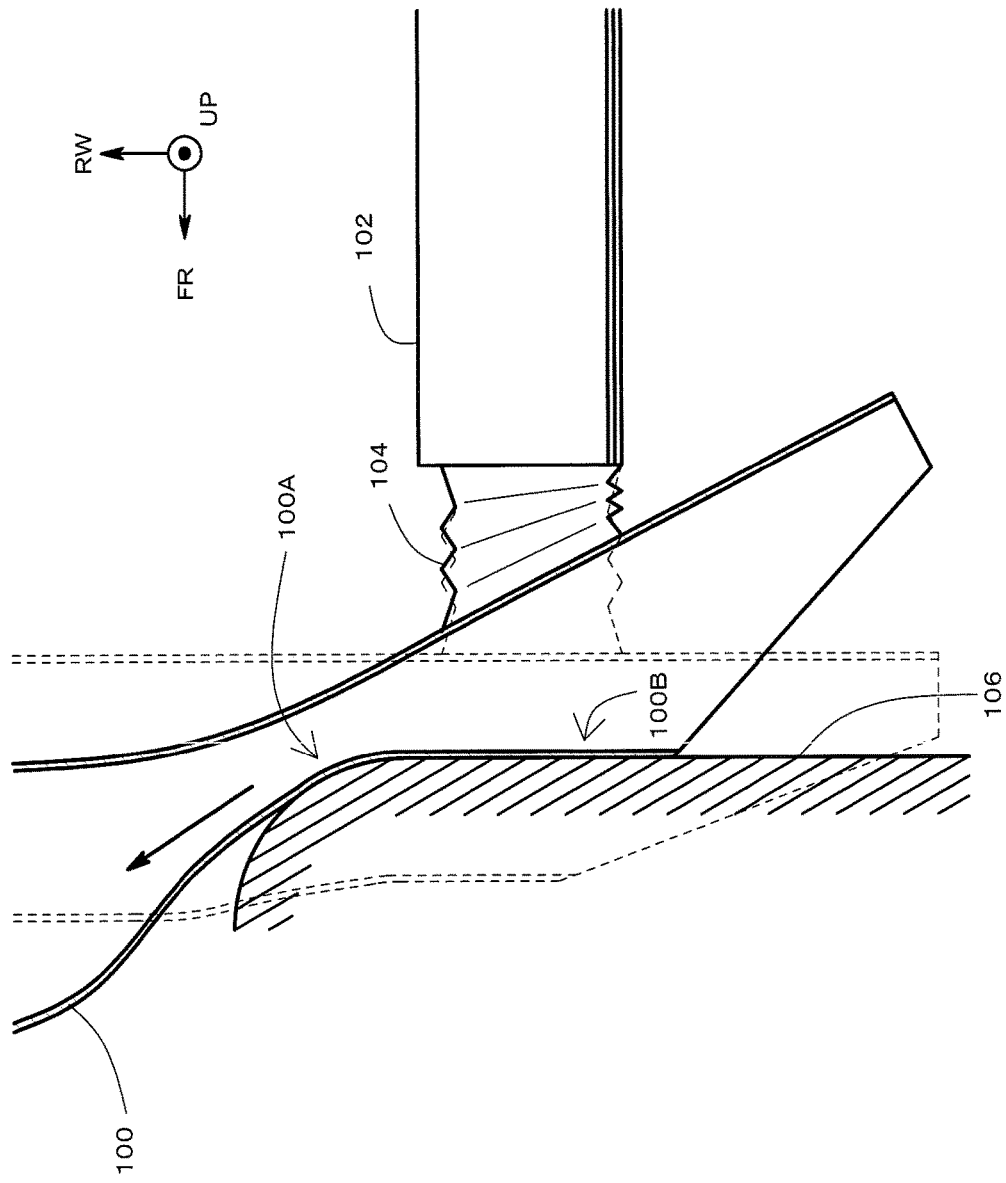
FIG. 11 is a diagram (1/2) for explaining passing-through of a vehicle during a small overlap collision.
Figure 12:
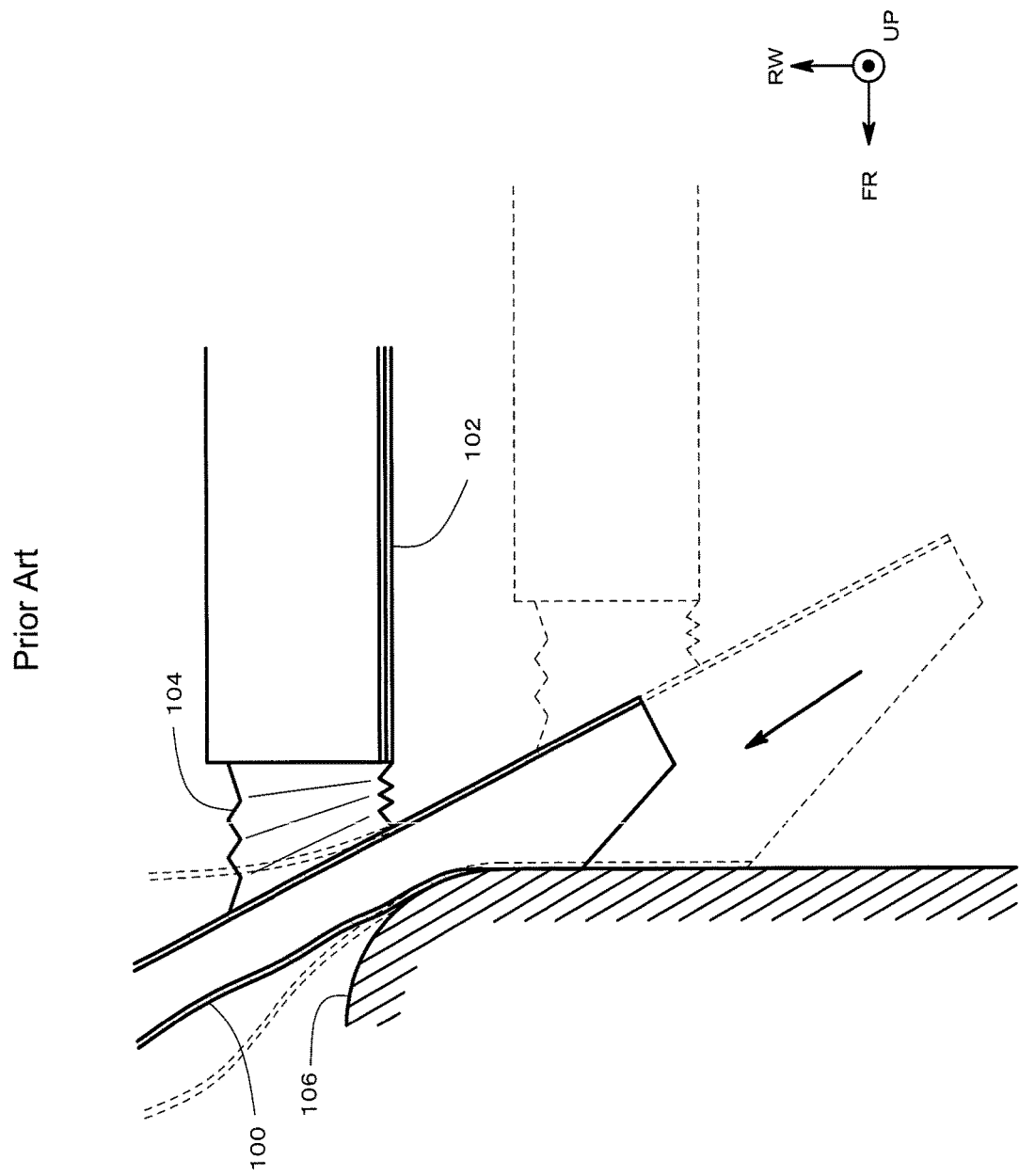
FIG. 12 is a diagram (2/2) for explaining passing-through of a vehicle during a small overlap collision.

FIG. 7 exemplifies a reinforcement member 16B according to another configuration of the present embodiment. In this configuration, the reinforcement member 16B is placed on the bumper RIF 12 at an outer side in the width direction in relation to the crash box 14. With such a configuration also, during the small overlap collision, the reinforcement member 16B is hooked on the barrier 40, and the passing-through of the vehicle from the barrier 40 can be suppressed. In particular, because a location of hooking is at an outer side in the width direction than the crash box 14, it becomes possible to more reliably hook the barrier 40 during the small overlap collision.

<Another Configuration of Side Skeleton Member>

In the embodiment shown in FIGS. 1~7, the Fr side member 10 is exemplified as the side skeleton member of the front part of the vehicle, but the side skeleton member is not limited to such a configuration. For example, in a vehicle of a ladder frame type, a side rail corresponds to the side skeleton member, and the reinforcement members 16, 16A, and 16B of the present embodiment may be applied with respect to the skeleton member including the side rail.

The present disclosure is not limited to the embodiment described above, and includes all changes and modification within the scope and spirit of the present disclosure as defined in the claims.

The invention claimed is:

1. A skeleton structure of a front part of a vehicle, comprising:
   a pair of side skeleton members that are provided on respective sides, in a width direction of the vehicle, of a front part of the vehicle, and that extend in a front-and-rear direction;
   a bumper reinforcement that extends in the width direction of the vehicle, that is connected to front ends of the pair of the side skeleton members, and that has a hollow, closed cross section structure; and
   a reinforcement member that has a higher rigidity than the bumper reinforcement and that is housed in an end, in the width direction of the vehicle, of the bumper reinforcement,
   wherein:
      at least a part of the reinforcement member is in contact with an inner surface of a front-side wall of the bumper reinforcement such that the reinforcement member extends from the inner surface of the front-side wall of the bumper reinforcement to an inner surface of a rear-side wall of the bumper reinforcement,
      the pair of the side skeleton members and the bumper reinforcement are connected to each other via a crash box which is more easily collapse-deformed in comparison to the pair of the side skeleton members and the bumper reinforcement,
      the reinforcement member is housed in a location of the bumper reinforcement in front of the crash box,
      a front of the reinforcement member includes an inner side that extends inwardly in the width direction so as to slope in a rearward direction,
      the reinforcement member comprises:
         a front-side wall that is disposed toward a front of the vehicle and extends in the width direction from an outer end to an inner end,
         a rear-side wall that is opposed to the front side-wall and extends in the width direction from an outer end to an inner end,
      the front-side wall has a width in the width direction that is smaller than a width of the rear-side wall,
      the width of the rear-side wall is greater than a width of a contact surface of the crash box that is in contact with the rear-side wall, and
      a length of an imaginary line extending from the inner end of the front-side wall to the rear-side wall in the front-and-rear direction of the vehicle is shorter than a distance extending perpendicularly from the imaginary line to the inner end of the rear-side wall in the width direction.

2. The skeleton structure of the front part of the vehicle according to claim 1, wherein:
   the reinforcement member has a sloped structure having the inner side that is located inward of the front-side wall in the width direction of the vehicle; and
   the crash box is configured to be collapse-deformed during a small overlap collision of the vehicle against a barrier to thereby cause the sloped structure to be brought into contact with the barrier.

3. The skeleton structure of the front part of the vehicle according to claim 1, wherein:
   the reinforcement member has a sloped structure having the inner side that is located inward of the front-side wall in the width direction of the vehicle; and
   a portion of the bumper reinforcement that is located forward of the sloped structure in the front-and-rear direction is configured to be collapse-deformed during a small overlap collision of the vehicle against a barrier to thereby form a pocket for receiving the barrier in an area located inward of the front-side wall in the width direction.

4. The skeleton structure of the front part of the vehicle according to claim 1, wherein:

the reinforcement member comprises an upper wall and a lower wall that connect the front-side wall and the rear-side wall, and the reinforcement member has a hollow inside which is open along the width direction of the vehicle.

* * * * *